United States Patent
Gardner, III et al.

(10) Patent No.: US 10,445,325 B2
(45) Date of Patent: Oct. 15, 2019

(54) PROXIMITY DETECTION

(71) Applicant: Google LLC, Mountain View, CA (US)

(72) Inventors: Alan Lee Gardner, III, Mountain View, CA (US); George Cody Sumter, Mountain View, CA (US); Nadav Aharony, Mountain View, CA (US)

(73) Assignee: Google LLC, Mountain View, CA (US)

( * ) Notice: Subject to any disclaimer, the term of this patent is extended or adjusted under 35 U.S.C. 154(b) by 426 days.

(21) Appl. No.: 14/622,762

(22) Filed: Feb. 13, 2015

(65) Prior Publication Data
US 2015/0234832 A1    Aug. 20, 2015

Related U.S. Application Data

(60) Provisional application No. 61/941,466, filed on Feb. 18, 2014.

(51) Int. Cl.
| G06F 17/30 | (2006.01) |
| G06Q 30/02 | (2012.01) |
| G06F 16/2457 | (2019.01) |
| G06Q 50/00 | (2012.01) |

(52) U.S. Cl.
CPC ....... G06F 16/24578 (2019.01); G06Q 30/02 (2013.01); G06Q 30/0261 (2013.01); G06Q 50/01 (2013.01)

(58) Field of Classification Search
CPC ........... G06F 17/30528; G06F 17/3053; G06F 17/3087; G06F 16/24578; G06Q 50/01; G06Q 30/02; G06Q 30/0261; H04W 4/02; H04W 4/206; H04L 51/32; H04L 67/306
See application file for complete search history.

(56) References Cited

U.S. PATENT DOCUMENTS

| 8,655,307 B1 * | 2/2014 | Walker .............. H04W 52/0212 |
| | | 455/405 |
| 2008/0288355 A1 | 11/2008 | Rosen |

(Continued)

FOREIGN PATENT DOCUMENTS

| CN | 101156487 | 4/2008 |
| CN | 103190115 | 7/2013 |
| WO | WO2012027877 | 3/2012 |

OTHER PUBLICATIONS

Kovach, Steve, "How to: Link Foursquare and GroupMe for Texting Nearby Friends", Business Insider, dated Feb. 18, 2011, 2 pages, http://www.businessinsider.com/how-to-send-a-text-to-your-foursquare-friends-using-groupme-2011-2.

(Continued)

*Primary Examiner* — Alex Gofman
*Assistant Examiner* — Umar Mian
(74) *Attorney, Agent, or Firm* — Patent Law Works LLP

(57) ABSTRACT

The disclosure includes a system and method for detecting proximity between users. The system includes a processor and a memory storing instructions that when executed cause the system to: determine a context associated with a first user device; query other user devices based on the context to create a set of other user devices that satisfy a query; generate a list of filtered devices by filtering the set of other user devices; notify the first user device of the list of filtered devices; and query for the list of filtered devices to determine which filtered devices are within proximity to the first user device.

18 Claims, 8 Drawing Sheets

(56) References Cited

U.S. PATENT DOCUMENTS

| | | | |
|---|---|---|---|
| 2009/0265775 A1* | 10/2009 | Wisely | H04L 63/0492 |
| | | | 726/9 |
| 2010/0198835 A1 | 8/2010 | Sorvari et al. | |
| 2011/0179064 A1 | 7/2011 | Russo | |
| 2011/0238755 A1 | 9/2011 | Khan et al. | |
| 2011/0282972 A1 | 11/2011 | Rosen | |
| 2012/0015668 A1* | 1/2012 | Mgrdechian | G06Q 30/0207 |
| | | | 455/456.1 |
| 2012/0088524 A1* | 4/2012 | Moldavsky | G06Q 30/02 |
| | | | 455/456.3 |
| 2012/0096490 A1* | 4/2012 | Barnes, Jr. | G06Q 10/02 |
| | | | 725/34 |
| 2012/0246244 A1* | 9/2012 | Mallet | G06Q 50/01 |
| | | | 709/206 |
| 2012/0278395 A1 | 11/2012 | Garcia | |
| 2012/0290950 A1 | 11/2012 | Rapaport et al. | |
| 2013/0079037 A1 | 3/2013 | Dobyns | |
| 2014/0207794 A1* | 7/2014 | Du | H04L 51/32 |
| | | | 707/748 |

OTHER PUBLICATIONS

International Search Report and Write Opinion for PCT/US2015/016203, dated May 19, 2015, 12 pages.

\* cited by examiner though; a letter after a reference number, e.g., "115a," represents a reference to the element having that particular reference number. A reference number in the text without a following letter, e.g., "115," represents a general reference to embodiments of the element bearing that reference number.

PROXIMITY DETECTION

CROSS REFERENCE TO RELATED APPLICATIONS

The present application claims priority, under 35 U.S.C. § 119, of U.S. Provisional Patent Application No. 61/941,466, filed Feb. 18, 2014 and entitled "Proximity Detection," which is incorporated by reference in its entirety.

BACKGROUND

The specification relates to device proximity detection.

Existing systems usually take advantage of Global Positioning System (GPS) to locate a user device and determine proximity between different user devices. However, GPS is power intensive and used infrequently, which results in a possibility of stale data. In addition, if GPS is used indoors, the GPS signal may not be available and, as a result, the user device switches to using WiFi or cellular means of location detection, which are much less accurate.

SUMMARY

According to one innovative aspect of the subject matter described in this disclosure, a system for detecting proximity between users includes a processor and a memory storing instructions that, when executed, cause the system to: determine a context associated with a first user device; query other user devices based on the context to create a set of other user devices that satisfy a query; generate a list of filtered devices by filtering the set of other user devices; notify the first user device of the list of filtered devices; and query for the list of filtered devices to determine which filtered devices are within proximity to the first user device.

In general, another innovative aspect of the subject matter described in this disclosure may be embodied in operations that include: wherein the first user device queries the list of filtered devices based on at least one of a Bluetooth protocol, receiving tokens instead of a media access control address for the filtered devices on the list of filtered devices and querying for the tokens; filtering the set of one or more other user devices based on a threshold degree of separation between a first user associated with the first user device and a second user associated with the set of one or more other user devices; filtering the set of one or more other user devices based on a threshold number of interactions between a first user associated with the first user device and a second user associated with the set of one or more other user devices; filtering the set of one or more other user devices based on privacy settings of the one or more other user devices; ranking the one or more filtered devices that are within proximity to the first user device based on their proximity to the first user device and one or more connections between the first user device and the one or more filtered devices and notifying a user of the first device of the one or more filtered devices in a ranked order; and determining actions of other user devices when in proximity to the first user device and notifying a user associated with the first user device to take steps to facilitate the actions of the devices when in proximity to the first user device.

These and other embodiments may each optionally include one or more of the following features. For instance, the features include: the context including one or more of a location, a time, an ongoing action and a future action associated with the first user device; the first user device being located at a destination and further comprising responsive to the one or more filtered user devices being within proximity to the first user device, sending information about the destination to the filtered user devices; and the first user device performing the querying to determine which filtered devices are within proximity to the first user device using a Bluetooth protocol.

Other aspects include corresponding methods, systems, apparatus, and computer program products for these and other innovative aspects.

The disclosure may be particularly advantageous in a number of respects. First, the system can accurately determine proximity between different users using Bluetooth techniques. For example, the system can figure out if users are in the same room, which can be difficult using other techniques. Second, the system reduces battery drain by can determine proximity between users without requiring users to activate the Bluetooth protocol. For example, devices in the system can search and pair with each other based on Bluetooth discovery protocol without the user's participation.

BRIEF DESCRIPTION OF THE DRAWINGS

The disclosure is illustrated by way of example, and not by way of limitation in the figures of the accompanying drawings in which like reference numerals are used to refer to similar elements.

DETAILED DESCRIPTION

Figure 1:
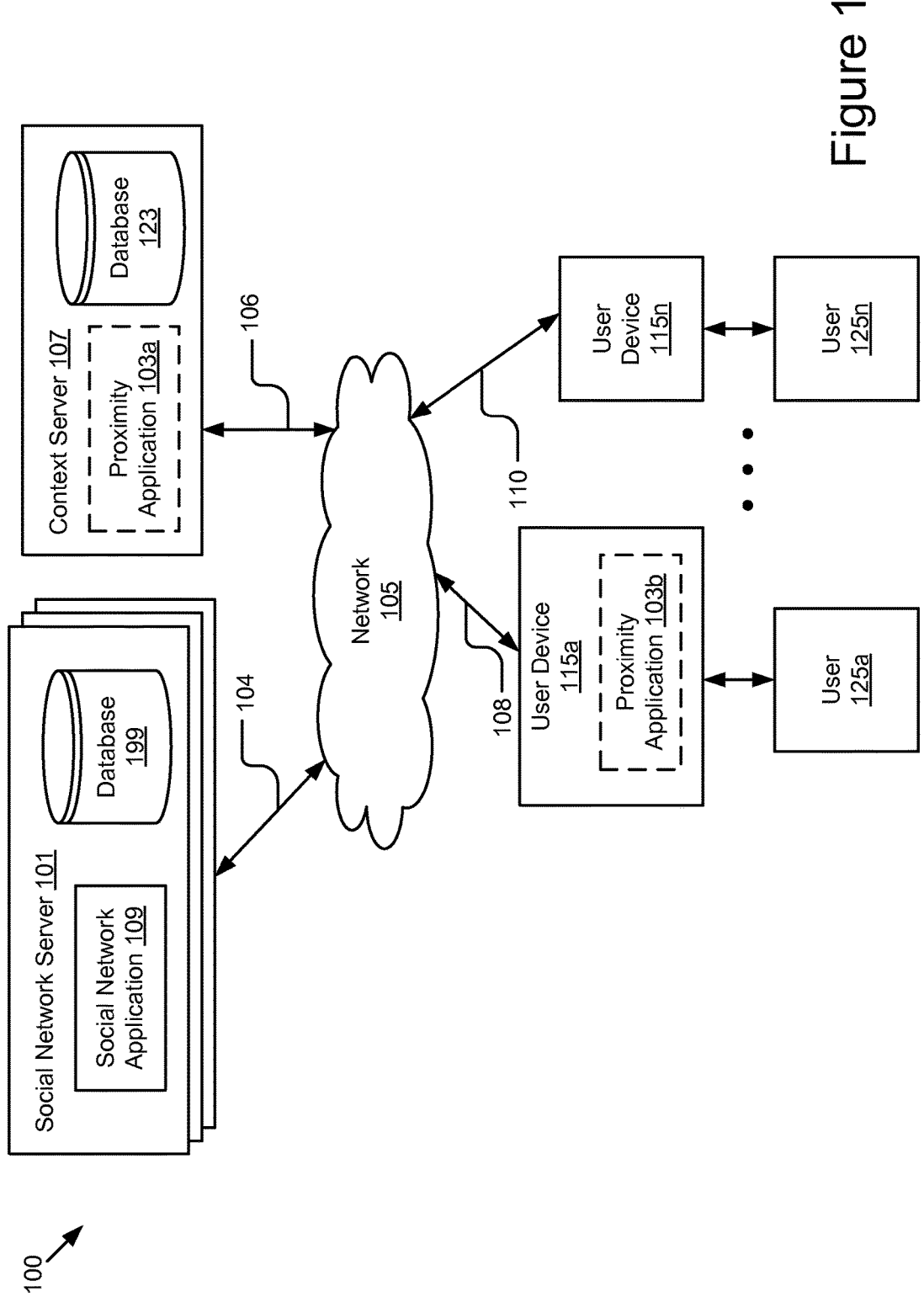
FIG. 1 is a block diagram illustrating an example system for determining proximity between users.

FIG. 1 illustrates a block diagram of one embodiment of a system 100 for determining proximity between user devices. The illustrated system 100 includes user devices 115a ... 115n that can be accessed by users 125a ... 125n, one or more social network servers 101 and a context server 107. In FIG. 1 and the remaining figures, a letter after a reference number, e.g., "115a," represents a reference to the element having that particular reference number. A reference number in the text without a following letter, e.g., "115," represents a general reference to embodiments of the element bearing that reference number. In the illustrated embodiment, these entities of the system 100 are communicatively coupled via a network 105. In some embodiments, the system 100 may include other servers or devices not shown in FIG. 1. For example, the system 100 may include a global positioning system (GPS) to aid in determining the location of a user device 115.

The social network server 101 can be a hardware server that includes a processor, a memory and network communication capabilities. The social network server 101 is communicatively coupled to the network 105 via signal line 104. In some embodiments, the social network server 101 sends and receives data to and from one or more of the user devices 115a, 115n and the context server 107 via the network 105. The social network server 101 includes a social network application 109 and a database 199. The database 199 stores social data associated with users. For example, the database 199 stores social data describing one or more of user profiles, posts, comments, videos, audio files, images, shares, acknowledgements, etc., published in a social network.

A social network can be a type of social structure where the users may be connected by a common feature. The common feature includes relationships/connections, e.g., friendship, family, work, an interest, etc. The common features may be provided by one or more social networking systems including explicitly defined relationships and relationships implied by social connections with other online users, where the relationships form a social graph. In some examples, the social graph can reflect a mapping of these users and how they can be related.

Multiple social network servers 101 are illustrated and represent different social networks coupled to the network 105, each having its own server, application and social graph. For example, a first social network may be more directed to business networking, a second may be more directed to an electronic messaging application where the social graph represents communications between users, a third may be directed to a social forum, a fourth may be directed to a blogging or microblogging environment, etc. In one embodiment, one of the social applications 109 is part of the context server 107.

In some embodiments, a proximity application 103a is operable on the context server 107, which is coupled to the network 105 via signal line 106. The context server 107 can be a hardware server that includes a processor, a memory and network communication capabilities. The context server 107, for example, sends and receives data to and from other entities of the system 100 via the network 105. While FIG. 1 illustrates one context server 107, the system 100 may include one or more context servers 107.

In some embodiments, the context server 107 determines a context based on signals received from other entities of the system 100 and thus determines one or more device identifiers or user identifiers based upon the context. For example, the signals can include time and location signals from the user devices 115 or other severs (not pictured) indicating current times and locations of the user devices 115. The signals can also include social signals maintained by the social network server 101 indicating social relationships between users. In another example, the signals are received from databases (e.g., database 199, database 123, etc.). In some embodiments, a context can describe a given state of the world around users. For example, a context describes that a user is heading home and can be defined as a context for home. In another example, a context indicates a certain period (e.g., 10 minutes, 30 minutes, one hour, etc.) after the current time. For example, the context describes that a user will arrive at a shopping mall in 15 minutes.

In some embodiments, the proximity application 103a can use the determined context as input (e.g., referred to as a signal) and determines a set of user devices 115 or certain actions as suggestions for the set of user devices 115 based on the context. For example, the proximity application 103a pre-calculates a set of candidate user devices 115 that may be within proximity to a first user device 115 and determines a subset of the candidate user devices 115 that the user of the first user device 115 may be interested in learning are nearby. In some embodiments, the proximity application 103a determines one or more actions to perform when the other user device 115 is within proximity. For example, the proximity application 103a determines content (e.g., music, video, etc.) to be pre-loaded on a home user device 115 (e.g., a music player, a television, a video player, etc.) for a user if the context indicates that the user is travelling home.

In the illustrated embodiment, the context server 107 includes a database 123 for storing data associated with the context server 107. The database 123 can be a non-transitory memory that stores data for providing the functionality described herein. The database 123 may be a dynamic random access memory (DRAM) device, a static random access memory (SRAM) device, flash memory or some other memory devices. In some embodiments, the database 123 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

In some embodiments, the proximity application 103b can be stored on a user device 115a, which is connected to the network 105 via signal line 108. In some embodiments, the user device 115a, 115n may be a computing device that includes a memory and a processor, for example a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network 105. In the illustrated embodiment, the user 125a interacts with the user device 115a. The user device 115n is communicatively coupled to the network 105 via signal line 110. The user 125n interacts with the user device 115n. The user devices 115a, 115n in FIG. 1 are used by way of example. While FIG. 1 illustrates two user devices 115a and 115n, the disclosure applies to a system architecture having any number of user devices 115.

In some embodiments, the user device 115 can be a mobile device that is included in a device worn by the user 125. For example, the user device 115 is included as part of a clip (e.g., a wristband), part of jewelry or part of a pair of glasses. In another example, the user device 115 can be a smart watch. The user 125 can view notifications from the proximity application 103 on a display of the user device 115 worn by the user 125. For example, the user 125 can view the notifications on a display of a smart watch or a smart wristband. The user 125 may also configure what types of notifications to be displayed on the user device 115 worn by the user 125. For example, the user 125 may configure the wearable user device 115 to blink for 5 seconds if a friend's mobile user device 115 is detected in proximity to the user 125.

In some embodiments, the proximity application 103 acts in part as a thin-client application that may be stored on the user devices 115a, 115n and in part that may be stored on the context server 107. For example, the proximity application 103b on the user device 115a generates a list of device identifiers associated with users 125 in the proximity of a user 125*a*, and sends the list of device identifiers to the proximity application 103*a* stored on the context server 107. The proximity application 103*a* determines if the users 125 permit their proximity to be displayed to the user 125*a* based on profiles or other social data of the users 125, and sends permission data indicating permission of the users 125 to the proximity application 103*b* on the user device 115*a* for presenting the proximity of the users 125 to the user 125*a* based on the permission data.

The network 105 can be a conventional type, wired or wireless, and may have numerous different configurations including a star configuration, token ring configuration or other configurations. Furthermore, the network 105 may include a local area network (LAN), a wide area network (WAN) (e.g., the Internet), and/or other interconnected data paths across which multiple devices may communicate. In some embodiments, the network 105 may be a peer-to-peer network. The network 105 may also be coupled to or includes portions of a telecommunications network for sending data in a variety of different communication protocols. In some embodiments, the network 105 includes Bluetooth communication networks or a cellular communications network for sending and receiving data including via short messaging service (SMS), multimedia messaging service (MMS), hypertext transfer protocol (HTTP), direct data connection, WAP, email, etc. Although FIG. 1 illustrates one network 105 coupled to the user devices 115, the social network server 101 and the context server 107, in practice one or more networks 105 can be connected to these entities.

The proximity application 103 can be code and routines for determining proximity between users. In some embodiments, the proximity application 103 can be implemented using hardware including a field-programmable gate array (FPGA) or an application-specific integrated circuit (ASIC). In some other embodiments, the proximity application 103 can be implemented using a combination of hardware and software. In some embodiments, the proximity application 103 may be stored in a combination of the devices and servers, or in one of the devices or servers. The proximity application 103 is described below in more detail with reference to FIGS. 2-5B.

Figure 2:
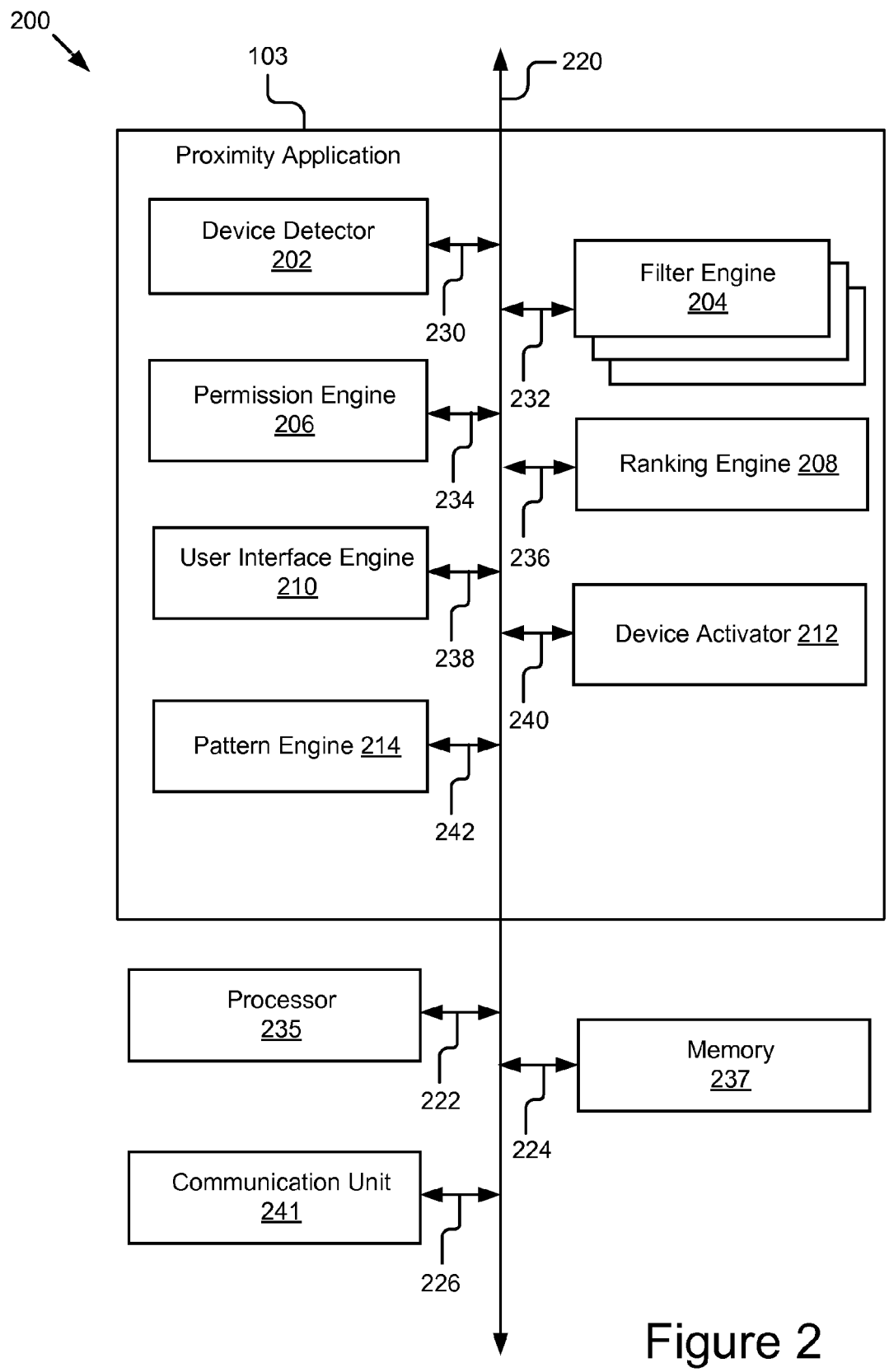
FIG. 2 is a block diagram illustrating an example proximity application.

Referring now to FIG. 2, an example of the proximity application 103 is shown in more detail. FIG. 2 is a block diagram of a computing device 200 that includes a proximity application 103, a processor 235, a memory 237 and a communication unit 241 according to some examples. The components of the computing device 200 are communicatively coupled by a bus 220. In some embodiments, the computing device 200 can be one of a user device 115 and a context server 107.

The processor 235 includes an arithmetic logic unit, a microprocessor, a general purpose controller or some other processor array to perform computations and provide electronic display signals to a display device. The processor 235 is coupled to the bus 220 for communication with the other components via signal line 222. Processor 235 processes data signals and may include various computing architectures including a complex instruction set computer (CISC) architecture, a reduced instruction set computer (RISC) architecture, or an architecture implementing a combination of instruction sets. Although FIG. 2 includes a single processor 235, multiple processors 235 may be included. Other processors, operating systems, sensors, displays and physical configurations are possible.

The memory 237 stores instructions and/or data that may be executed by the processor 235. The memory 237 is coupled to the bus 220 for communication with the other components via signal line 224. The instructions and/or data may include code for performing the techniques described herein. The memory 237 may be a dynamic random access memory (DRAM) device, a static random access memory (SRAM) device, flash memory or some other memory device. In some embodiments, the memory 237 also includes a non-volatile memory or similar permanent storage device and media including a hard disk drive, a floppy disk drive, a CD-ROM device, a DVD-ROM device, a DVD-RAM device, a DVD-RW device, a flash memory device, or some other mass storage device for storing information on a more permanent basis.

The communication unit 241 transmits and receives data to and from at least one of the user device 115, the context server 107 and the social network server 101 depending upon where the proximity application 103 may be stored. The communication unit 241 is coupled to the bus 220 via signal line 226. In some embodiments, the communication unit 241 includes a port for direct physical connection to the network 105 or to another communication channel. For example, the communication unit 241 includes a USB, SD, CAT-5 or similar port for wired communication with the user device 115.

In some embodiments, the communication unit 241 includes a wireless transceiver for exchanging data with the user device 115 or other communication channels using one or more wireless communication methods, including IEEE 802.11, IEEE 802.16, Bluetooth® or another suitable wireless communication method. The communication unit 241 communicates with a first user device 115 using Bluetooth by broadcasting a media access control address (MAC address) for the second user device 115 to use to discover the first user device 115. The second user device 115 will pair with the first user device 115. For example, two user devices 115 can be paired to each other wirelessly using Bluetooth, such as a cell phone and a headset so that the user can make phone calls without having to hold the phone.

The MAC address is a unique identifier for a user device 115 that is stored in the user device 115 hardware. Because the MAC address is static, it could be used for illegitimate purposes. As a result, in one embodiment, the communication unit 251 receives a token from the context server 107 to broadcast instead of the MAC address for use with the proximity application. In another embodiment, the device detector 202 on the user device 115 generates the token and transmits it to the communication unit 251 for sending to other user devices 115. The token will be described in greater detail below with reference to the device detector 202.

In some embodiments, the communication unit 241 includes a cellular communications transceiver for sending and receiving data over a cellular communications network including via short messaging service (SMS), multimedia messaging service (MMS), hypertext transfer protocol (HTTP), direct data connection, WAP, e-mail or another suitable type of electronic communication. In some embodiments, the communication unit 241 includes a wired port and a wireless transceiver. The communication unit 241 also provides other conventional connections to the network 105 for distribution of files and/or media objects using standard network protocols including TCP/IP, HTTP, HTTPS and SMTP, etc.

In the illustrated embodiment shown in FIG. 2, the proximity application 103 includes a device detector 202, one or more filter engines 204, a permission engine 206, a ranking engine 208, a user interface engine 210, a device activator 212 and a pattern engine 214. These components of the proximity application 103 are communicatively coupled to each other via the bus 220.

The device detector 202 can be software including routines for detecting devices. In some embodiments, the device detector 202 can be a set of instructions executable by the processor 235 to provide the functionality described below for detecting user devices 115. In some embodiments, the device detector 202 can be stored in the memory 237 of the computing device 200 and can be accessible and executable by the processor 235. The device detector 202 may be adapted for cooperation and communication with the processor 235 and other components of the computing device 200 via signal line 230.

In some embodiments, the device detector 202 determines a location of a user's device. The user device 115 can be any user device 115 having communication capability (e.g., embedded or coupled Bluetooth communication components), for example, a laptop computer, a desktop computer, a tablet computer, a mobile telephone, a personal digital assistant (PDA), a mobile email device, a portable game player, a portable music player, a reader device, a television with one or more processors embedded therein or coupled thereto or other electronic device capable of accessing a network. In some embodiments, the user device 115 can be a wearable computer. For example, the device detector 202 determines a location for a user device 115 based on GPS techniques. In another example, the device detector 202 determines a location for a user device 115 based on Bluetooth techniques, infrared, audio signals, etc.

In some other embodiments, the device detector 202 receives recorded locations of a user device 115 from one or more of the databases (e.g., the database 199, the database 123, etc.) and determines a general location of the user device 115. For example, the user device 115 usually checks in with a social network and the database 199 stored its historical locations based on the check-ins. The device detector 202 determines a general location for the user device 115 based on its historical locations. For example, the user device 115 is a home device (e.g., a television, a video player, etc.) for the user and it is usually checked in at home. Then the device detector 202 determines home as its general location. In another example, the user device 115 is a cell phone and during a certain period of time (e.g., 9 AM-6 PM on weekdays) it is usually with the user and at the user's work place. The detector 202 determines that the user device 115 is at the user's work place if the time is 4 PM on a weekday.

In some embodiments, the device detector 202 determines a context for a user device 115. For example, the context for a user device 115 describes a time, a location, an ongoing action, and/or a possible future action (e.g., an action in 30 minutes, etc.) associated with the user. In some embodiments, the device detector 202 also receives signals from the user device 115, the servers and/or from the databases (e.g., social signals indicating the user's current social activities, etc.) and determines a context based on the signals.

The device detector 202 detects other user devices 115 based on the determined location of a first user device 115 by querying for the other user devices 115. In some embodiments, the device detector 202 pings for nearby devices for a first user device 115 based on a Bluetooth protocol. The device detector 202 can determine the presence of other user devices 115 by sending a message to the other user devices 115. For example, the device detector 202 stored in a first user device 115 sends a communication message to one or more second user devices 115 based on Bluetooth protocol by scanning for MAC addresses for known user devices 115. If the second user device 115 sends a response back to the first user device 115, the first user device 115 and the second user devices 115 are paired. For example, if one second user device 115 is within a range of the first user device 115 and receives the communication message from the first user device 115, the second user device 115 can send a response back to the first user device 115 to be paired with the first user device 115. Bluetooth generally extends to only a few hundred meters. As a result, in one embodiment, the device detector 202 uses a combination of technologies to determine the location of the other user devices 115, such as GPS, for determining user devices 115 that recently updated or checked into a social network, etc. As a result, the range can be a few meters, a few miles (e.g., one mile, two miles, three miles, five miles), around 30 miles, or approximately 50 miles. In another embodiment, the device detector 202 uses other devices when in close proximity, such as infrared and audio signals.

In some embodiments, the device detector 202 receives a list of device identifiers or user identifiers from the user device 115. For example, the operating system in the user device 115 maintains a list of device identifiers associated (paired) with the user device 115 or user identifiers associated with the user of the user device 115 (e.g., a contact list, a list of devices or users frequently nearby the user of the device, etc.). The device detector 202 receives the list of device identifiers or user identifiers and pings for the user devices 115. For example, the list has fields that the device detector 202 can identify using Bluetooth techniques.

In some embodiments, the device identifier being used for Bluetooth techniques is a MAC address that uniquely identifies the user device 115. In other embodiments involving Bluetooth techniques where the device detector 202 is stored on the user device 115, the device detector 202 receives tokens to replace the MAC addresses from the device detector 202 on the event server 107 to protect the user device 115 against misuse of the MAC address. In some embodiments, the device detector 202 on the event server 107 generates a token (for example after registration with the proximity application 103) and permanently assigns the token to the user device 115. In other embodiments, the device detector 202 on the event server 107 periodically issues new tokens so that the tokens are also not misused. For example, the device detector 202 could employ rotating MAC addresses as tokens where the new MAC addresses are issued every week, month, year, etc. In other embodiments, the device detector 202 on the user device 115 generates its own token (e.g. one time or periodically) and transmits the token to the event server 107 for identification purposes. The device detector 202 transmits the token to the communication unit 251 on the user device 115 to be used in the discovery process with other user devices 115.

In some embodiments, the device detector 202 queries all other user devices 115 within range of the first device. In some embodiments, the device detector 202 queries a subset of other user devices 115 within a range to a first user device 115 due to the memory limitations and battery life limitations. For example, the device detector 202 in a first user device 115 pings for a subset of other user devices 115 within a three mile radius of the first user device 115 picked based on certain criteria. Example criteria can include social connections between users, common interests based on user profiles or activities, a historical status of devices, signals from other applications, etc. In some embodiments, the device detector 202 queries the other devices within proximity to the first user device 115 and then sends information about the pinged user devices 115 to the filter engines 204, the list generator 206, the permission engine 208, or the ranking engine 212 for filtering the list of pinged user devices 115 to generate a subset for providing to the first user device 115. In some other embodiments, the device detector 202 receives a list of other user devices 115 for a first user device 115 selected by the filter engines 204 or the list generator 206 based on one or more of the certain criteria (e.g., the user of the first user device 115 may know the users associated with the list of other user devices 115) and queries the list of the other user devices 115 to detect if they are within proximity to the first user device 115. In some embodiments, the device detector 202 receives a list of other user devices 115 filtered by the permission engine 208 and pings for user devices 115 in the list that are within proximity to the first user device 115. In some other embodiments, the device detector 202 receives a list of other devices filtered by the ranking engine 212 and pings for user devices 115 in the list. For example, the ranking engine 212 picks the top 50 users in a list and the device detector 202 queries the top 50 user devices 115 to pair with the first user device 115.

In some embodiments, the device detector 202 queries a database (not pictured) that stores data connecting user identifiers to their device identifiers. For example, the device detector 202 queries the database using a list of user identifiers (e.g., a filtered list of user identifiers by the above mentioned engines) and receives the device identifiers. The device detector 202 then pings for the user devices 115 based on the device identifiers.

In some embodiments, the device detector 202 scans for devices within proximity to a first user device 115 and sends the detected devices to other appropriate engines for filtering and providing to the first user. For example, the device detector 202 scans for user devices 115 by querying the user devices 115 one by one and if one of the user devices 115 is within the radio range, the user device 115 can respond to enable the device detector 202 to know it is nearby. In some other embodiments, the device detector 202 scans for user devices 115 within proximity to a first user device 115 and sends the detected devices to the context server 107 that processes the detected devices and determines which user devices 115 to provide a list of detected devices. In this way, a user device 115 can be inactively detected and provided a list of other user devices 115 within proximity to it.

In some embodiments, the device detector 202 detects user devices 115 within proximity based on other technologies or communication protocols. For example, the device detector 202 detects user devices 115 using GPS techniques. In another example, the device detector 202 detects user devices 115 based on infra-red detection techniques. A person skilled in the relevant art will appreciate that device detector 202 can detect devices using any other appropriate device detection technologies.

The filter engines 204 can be software including routines for filtering user devices 115 based on certain criteria and generating a list of filtered devices. In some embodiments, the filter engines 204 can be a set of instructions executable by the processor 235 to provide the functionality described below for filtering user devices 115 based on certain criteria. In some embodiments, the filter engines 204 can be stored in the memory 237 of the computing device 200 and can be accessible and executable by the processor 235. The filter engines 204 may be adapted for cooperation and communication with the processor 235 and other components of the computing device 200 via signal line 232.

In some embodiments, one or more of the filter engines 204 can determine social connections between users based on social networks, filter user devices 115 based on user connections and generate a list of filtered devices. For example, one or more of the filter engines 204 receive social data (e.g., profiles, relationships, a social graph, etc.) from one or more social networks and determine if and how users are connected. In some embodiments, one or more of the filter engines 204 can authenticate with different social networks. In some embodiments, one or more of the filter engines 204 can define a common standard for determining user connections. For example, one or more of the filter engines 204 define a first-degree connection as a first user following a second user, the first user and the second user being friends, the first and second users being part of a group on a social network, etc. Alternatively, the filter engines 204 define a first degree connection as the first user following the second user and the second user following the first user in a social network. The one or more filter engines 204 can filter user devices 115 by omitting user devices 115 from the set of other user devices 115 whose users have no connections to the user associated with the first user device 115. This type of filter engine 204 can be referred to as a social connection filter engine 204. For example, a social connection filter engine 204 residing in a user device 115 operated by a first user 125a filters out user devices 115 used by second users 125 having a threshold degree of social connections with the first user 125a. For example, the social connection filter engine 204 can remove other user devices 115 from the set of other user devices 115 where the user associated with the first device 115 has two or fewer degrees of connection to the users associated with the other user devices 115 used by the second users 125 having no social connections with the first user 125a from a list and keep the user devices 115 whose users 125 have social connections with the first user 125a in the list.

In one embodiment, the social connection filter engine 204 determines a type and a level of social connection between users and filters from the set of other user devices 115 based on the type and the level. Type includes, for example, different foundations for the social connection such as friend, co-worker and family. Level includes, for example, different gradations within the same type. For example, users can be acquaintances, good friends or best friends. In other embodiments, the type and the level are also used by the ranking engine to rank user devices 115 within the list of filtered devices.

In some embodiments, the social connection filter engine 204 can determine user connections based on other types of sources for social relationships. For example, besides the social networks described above, the sources for social relationships can also include emails, micro-blogs, blogs, forums, user contact lists, corporate employee databases, organizational charts, etc. For example, the social connection filter engine 204 can determine if users are connected by checking users' contact lists or by determining if users have sent or received a certain number of emails (e.g., one email, five emails, 10 emails, 50 emails, etc.) to or from each other in a certain period of time (e.g., in a week, in a month, in a year, etc.). In another example, the social connection filter engine 204 can determine user connections by analyzing corporate employee databases or school alumni databases, etc. For example, the social connection filter engine 204 determines that users are connected if they have worked for the same employer or if they have studied at the same school.

In some embodiments, the filter engines 204 can include filter engines 204 that identify people who are connected implicitly by something they share in common. The different types of filter engines 204 operate individually or cooperate with each other to filter the user devices 115 based on certain criteria. In one embodiment, a profile or interest filter engine 204 can filter user devices 115 based on user profiles or interests. For example, a profile or interest filter engine 204 receives a user's profile and/or data describing user activities, determines the user's characteristics (e.g., interests, affiliations, etc.) based on the user's profile and/or activities and filters other user devices 115 for displaying to the user based on the user's characteristics. For example, a first user's profile indicates that the first user is part of a parenting and motorcycling communities; a profile or interest filter engine 204 determines that the first user might be interested in parenting and motorcycling and thus selects user devices 115 used by second users who are also interested in either of the parenting and motorcycling. In another example, for a dating app, a profile or interest filter engine 204 can find candidate users using user devices 115 within proximity of a user device 115 used by a searching user based on their profiles on the dating app. For example, the candidate users' profiles match or are relevant to the profile of the searching user; the profile or interest filter engine 204 filters out other users whose profiles are not relevant to the profile of the searching user even though the other users are also in proximity of the searching user. In this way, the searching user can be saved a significant amount of time for picking candidates from the list of user devices 115 used by users within proximity, especially when the list is substantially long. The searching user can be provided other users nearby without giving out personal information (e.g., phone number, etc.).

The profile or interest filter engine 204 can also determines user characteristics based on user activities. Example user activities include, but are not limited to, physical activities (e.g., running, walking, sleeping, driving, talking to someone, biking, talking to a group, hiking, etc.), activities on social networks (e.g., playing online games on a social network, publishing posts and/or comments, acknowledging posts, sharing posts, etc.) and activities on user devices 115 (e.g., opening an application, listening to a playlist, calling a contact, writing emails, viewing photos, watching videos, etc.). Other example activities are possible. By analyzing the user activities, the profile or interest filter engine 204 can determine a first user's hobbies or interests and filter other users to select a set of second users who have the same or relevant hobbies or interests for introduction to the first user when they are within proximity of each other.

In one embodiment, where the first user device 115 is used by a store, the filter engines 204 include a club filter engine 204 that filters other user devices 115 for the first user device 115 based on loyalty club points or based on places or stores where the user has visited frequently in history (e.g., at least once a week, etc.). For example, the club filter engine 204 selects nearby user devices 115 for a first user device 115 so that the device activator 214 can transmit notifications to the other user devices 115, such as coupons for users with loyalty points that exceed a threshold value.

In one embodiment, one filter engine 204 can filter user devices 115 for a user based on a signal indicating that the user devices 115 will be in physical proximity to the user device 115. For example, the filter engine 204 (referred to as a "signal filter engine 204") selects the user devices 115 that have checked in to the server (e.g., the context server 107, the social network server 101, etc.) within in a certain distance (e.g., 0.5 mile, one mile, two miles, etc.) from a first user's location and within a certain time range (e.g., in the past 10 minutes, in the past two hours, etc.). The signal that the user devices 115 have checked in to the server within a certain distance from the first user's location within in a certain time range indicates that the user devices 115 will likely be in physical proximity to the first user device 115.

In one embodiment, one filter engine 204 can filter user devices 115 for a first user based on a threshold of interactions between the first user associated with the first user device 115 and a second user associated with one or more of the other user devices 115. For example, the filter engine 204 filters the set of user devices 115 for one or more second users that the first user has had reciprocal messaging with (i.e. the first user contact the second user and the second user contacted the first user) or the first user meets or contacts the second user at a certain frequency (e.g., at least once a week, etc.). The frequency can be determined in conjunction with the device detector 202, which defines contact as being within a certain proximity (e.g. the same room). This establishes the foundation for defining situations such as people who get together for lunch every week. For example, a first user would find it helpful to be notified of a second user being within proximity if they were frequent lunch companions.

One skilled person in the relevant art will recognize that other types of filter engines are possible to implement filtering user devices 115 for a user. In some embodiments, a geographic filter engine 204 filters user devices 115 based on their geographic locations. For example, the geographic filter engine 204 receives recorded location data for user devices 115 from the database 123 and determines a subset of the user devices 115 based on their last recorded locations.

In one embodiment, the filter engine 204 filters the set of other devices 115 based on other user devices 115 that have interacted with a first user device 115 most recently. For example, the filter engine 204 constructs a filtered list that includes second user devices 115 sending at least 10 instant messages to a first user device 115 in the past week and the filter engine 204.

In one embodiment, the filter engine 204 generates a filtered list including second user devices 115 that are frequently around a first user device 115. For example, if one or more second devices 115 are near a first user device 115 for certain times or more (e.g., five times, 10 times, etc.), the filter engine 204 generates a filtered list including the one or more second user devices 115 for the device detector 202 to query.

In some embodiments, the filter engine 204 generates a filtered list of user devices 115 by cross-referencing one or more likelihood maps. In some embodiments, the filter engine 204 receives a signal from a GPS device embedded in or coupled to a user device 115. The GPS signal can indicate that certain other user devices 115 may be within proximity. The filter engine 204 generates a list of user devices 115 by referencing the GPS signal. In some embodiments, the filter engine 204 generates a list of user devices 115 based on a software update through a server. For example, a user updates software on the user device 115 through the social network server 101; the filter engine 204 receives a signal indicating the phone software update and generates a list based on the signal. In some embodiments, the list generator 206 uses social network check-ins to generates a suggestion list of devices to ping for. For example, the social network check-ins indicate that friends of a first user are within the proximity of the first user; the filter engine 204 generates a suggestion list of user devices 115 associated with the friends to query. In some embodiments, the filter engine 204 receives a WiFi signal and confirms a list of user devices 115 within proximity based on the WiFi signal.

In some embodiments the filter engines 204 generate an aggregated filtered list from the filtered lists of multiple filter engines 204. For example, the top five picks for each filtered list are aggregated and duplicates are removed.

In some embodiments, the filter engines 204 are stored on the context server 107 and provide a filtered list to a device detector 202 stored on the first user device 115, which pings the user devices 115 on the filtered list. In another embodiment, the filter engines 204 transmit the filtered list to the permission engine 206 on the first user device 115 and the permission engine 206 transmits a list of filtered user devices 115 that the device detector 202 has permission to ping.

The permission engine 206 can be software including routines for allowing users to configure privacy settings. In some embodiments, the permission engine 206 can be a set of instructions executable by the processor 235 to provide the functionality described below for allowing users to configure privacy settings. In some embodiments, the permission engine 206 can be stored in the memory 237 of the computing device 200 and can be accessible and executable by the processor 235. The permission engine 206 may be adapted for cooperation and communication with the processor 235 and other components of the computing device 200 via signal line 234.

In some embodiments, the permission engine 206 allows users to select which other users or which type of other users can ping for the device identifiers associated with the user devices 115. For example, the permission engine 208 cooperates with the user interface engine 210 to provide a user interface for a first user to give permission to one or more other users to detect the first user's proximity. In some embodiments, the permission engine 208 can generate suggestions for a first user about other users to be given permission based on the first user's social connections and provide the suggestions to the first user through the user interface. For example, the permission engine 208 provides the first user with the option of permitting types of connections (e.g., friends, family, etc.) in a certain social network to detect the first user's proximity. In some embodiments, the permission engine 208 receives an input from a first user specifying other users allowed to detect the first user's proximity and configures privacy settings for the first user device 115 specifying the other users allowed to detect the first user device 115. In some embodiments, the permission engine 208 notifies the first user and the permitted other users or obtains their confirmations before configuring privacy settings for the first user device 115. For example, the permission engine 208 cooperates with the server (e.g., social network server 101, context server 107, etc.) to generate emails to send to the first user and the permitted other users for notification or confirmation.

In some embodiments, the permission engine 208 protects user device 115 privacy using fake media access control (MAC) addresses. The permission engine 208 substitutes the MAC address for a first user device 115 with a newly generated fake MAC address. The permission engine 208 sends the fake MAC address to the other user devices 115 so that they will use the fake MAC address when pinging for the first user device 115. In some embodiments, the list of MAC addresses can be cycled and shared. For example, every six months a new fake MAC addresses is associated with the first user device 115. The fake MAC address can be part of a group of MAC addresses or the fake MAC address can be newly generated each time.

The ranking engine 208 can be software including routines for generating a ranked list of users and their proximity. In some embodiments, the ranking engine 208 can be a set of instructions executable by the processor 235 to provide the functionality described below for generating a ranked list of users and their proximity. In some embodiments, the ranking engine 208 can be stored in the memory 237 of the computing device 200 and can be accessible and executable by the processor 235. The ranking engine 208 may be adapted for cooperation and communication with the processor 235 and other components of the computing device 200 via signal line 236.

The ranking engine 207 receives a filtered list of second user devices 115 from the device detector 202 that are within proximity of the first user device 115. The ranking engine 207 ranks the second user devices 115 within the filtered list based on certain criteria. In one embodiment, the ranking engine 208 ranks the second user devices 115 based on their physical distances to the first user device 115, and generates a ranked list of the second user devices 115. In another embodiment, the ranking engine 208 ranks the second user devices 115 based on their social connections to the first user. For example, the second users with a first-degree social connection to the first user appear higher in the ranked list than second users with a second-degree social connection. In yet another embodiment, the ranking engine 208 ranks the second user devices 115 based on a combination of the physical distance and the social connection to the first user. For example, the ranking engine 208 assigns weights to the two factors (physical distance and social connection) based on a certain algorithm and calculates ranking scores for the second user devices 115 by applying the weights. In this way, a second user who has a closer social connection to the first user (e.g., family) than other users (e.g., friends, followers, etc.) may appear higher in the ranked list even if the second user is physically farther away from the first user than other users ranked lower. The ranking engine 208 instructs the user interface engine 210 to generate graphical data for displaying the ranked list.

In some embodiments, the ranking engine 208 rearranges an order of the second user devices 115 in the filtered list for a first user based on a current context of the first user and/or the second users. For example, if the context server 107 determines a context that the first user is participating in a professional convention, the ranking engine 208 ranks the first user's coworkers and business partners higher in the list. In another example, if the device detector 202 detects that the first user left work and is in a bar, the ranking engine 208 ranks the first user's friends higher than business partners or clients.

In some embodiments, the ranking engine 208 picks a certain number of top user devices 115 in the list based on the ranking For example, the ranking engine 208 picks the top 100 users from the list. In another example, the ranking engine 208 picks the top 10 users from the list of 50 users and cycles the list in case the context changes. For example, at the end of each day the list can be cycled and the ranking engine 208 re-ranks the list based on the new context.

The user interface engine 210 can be software including routines for generating graphical data for providing user interfaces to users. In some embodiments, the user interface engine 210 can be a set of instructions executable by the processor 235 to provide the functionality described below for generating graphical data for providing user interfaces to users. In some embodiments, the user interface engine 210 can be stored in the memory 237 of the computing device 200 and can be accessible and executable by the processor 235. The user interface engine 210 may be adapted for cooperation and communication with the processor 235 and other components of the computing device 200 via signal line 238.

Figure 6:
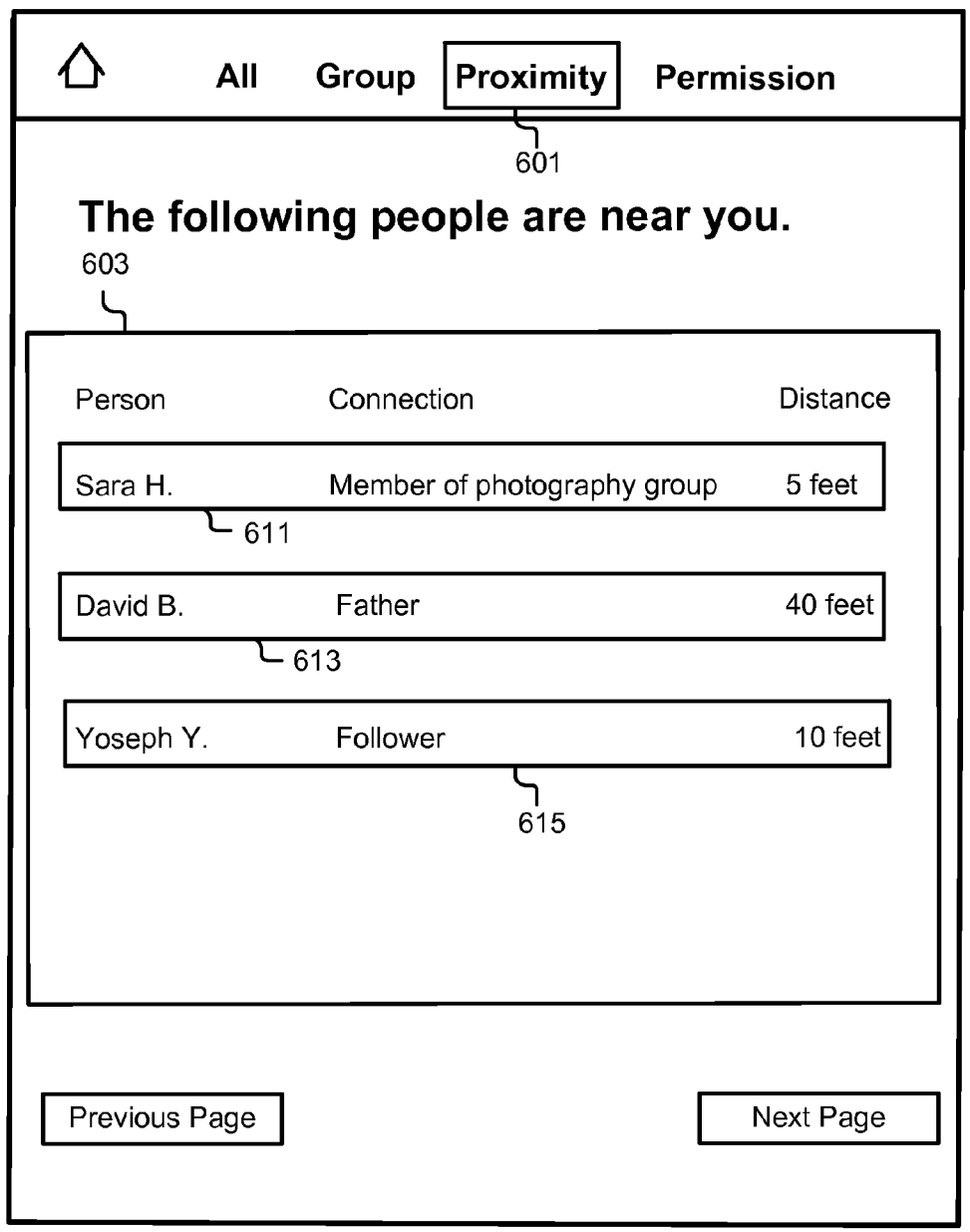
FIG. 6 is a graphic representation of an example user interface for notifying a user of a list of other user devices within proximity of the first user device according to one embodiment.
Figure 7:
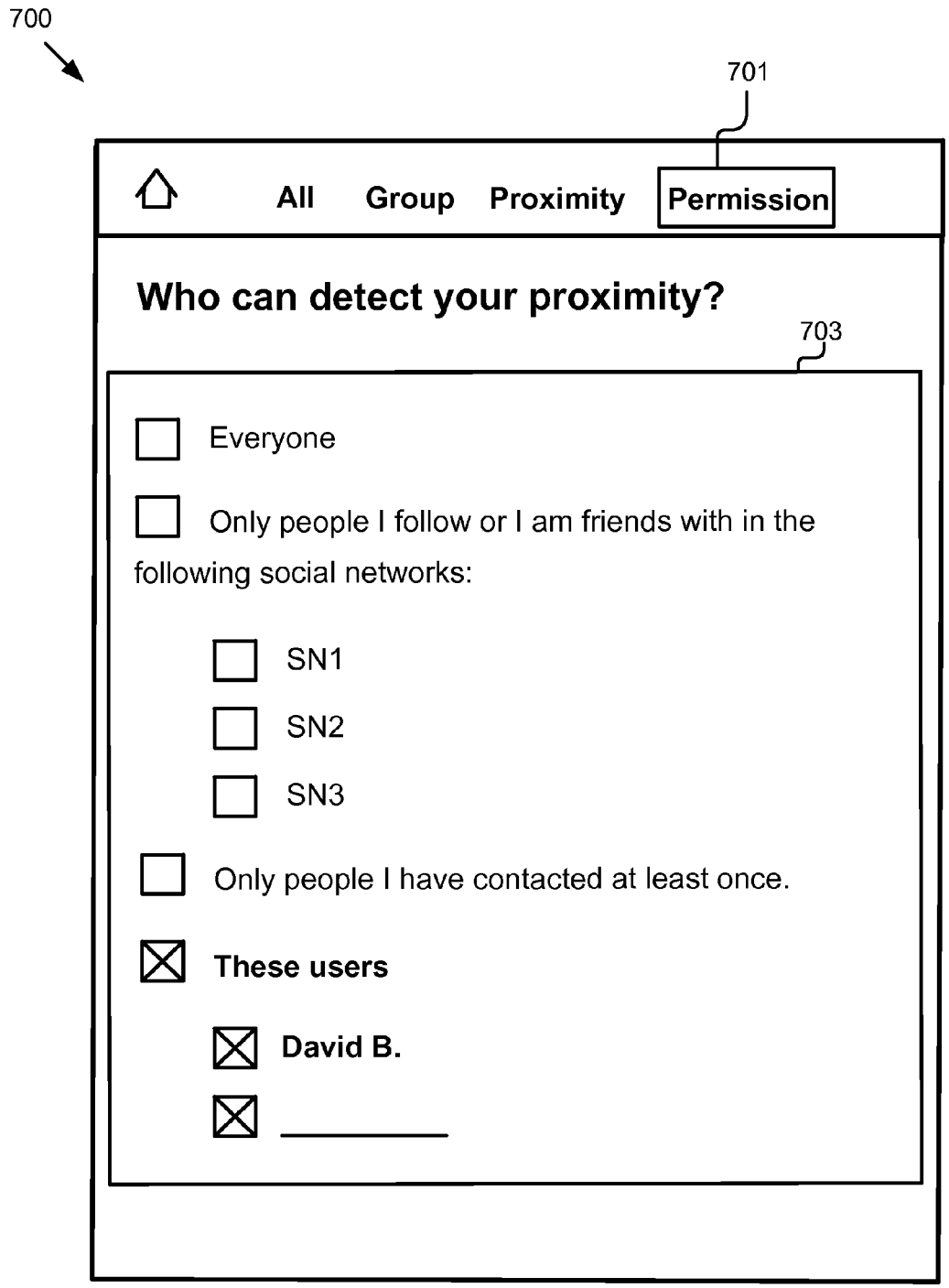
FIG. 7 is a graphic representation of an example user interface of permission settings according to one embodiment.
Figure 8:
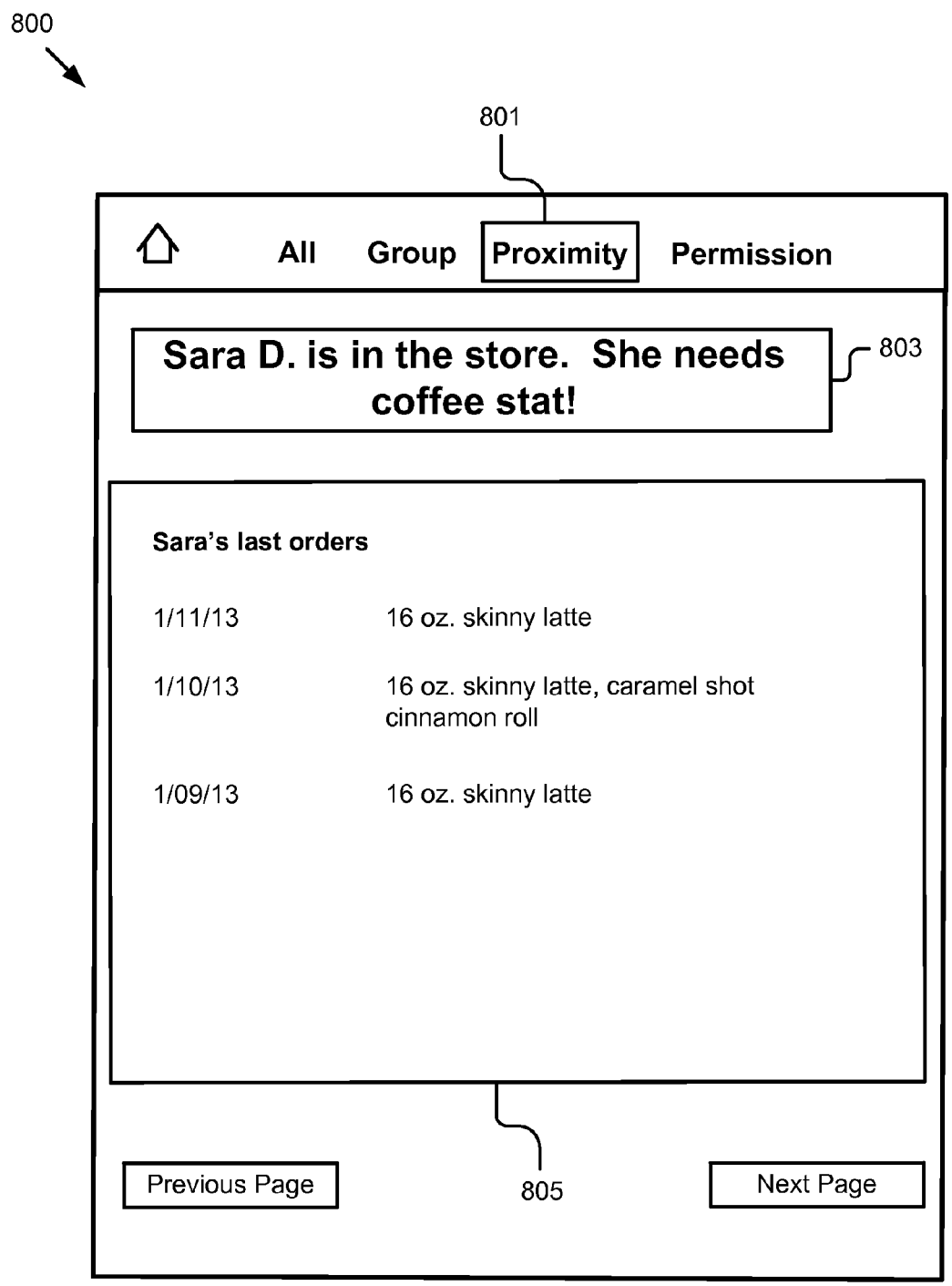
FIG. 8 is a graphic representation of an example user interface for providing actions associated with user devices within proximity to the first user device.

In some embodiments, the user interface engine 210 generates graphical data for providing a user interface to a first user device 115 for displaying a list of second user devices 115 within proximity of the first user device 115. The user interface engine 210 receives instructions from the device detector 202 if the filtered list is unranked or from the ranking engine 208 if the data is a ranked list. The user interface engine 210 sends the graphical data to the first user device 115, causing the first user device 115 to present the user interface to a user operating on the first user device 115. In some embodiments, the user interface engine 210 receives instructions from the permission engine 206 to generate graphical data for providing a user interface that allows a user to permit other users to detect the user device's 115 proximity. The user interface engine 210 may generate graphical data for providing other user interfaces to users. For example, the user interface engine 210 receives instructions from the pattern engine 214 to generate graphical data for providing a user interface that displays a history of the user's actions while in proximity of the first user device 115. Example user interfaces are shown in FIGS. 6-8.

The device activator 212 can be software including routines for performing actions based on user's proximity to a user device 115. In some embodiments, the device activator 212 can be a set of instructions executable by the processor 235 to provide the functionality described below for performing actions based on user's proximity to the user device 115. In some embodiments, the device activator 212 can be stored in the memory 237 of the computing device 200 and can be accessible and executable by the processor 235. The device activator 212 may be adapted for cooperation and communication with the processor 235 and other components of the computing device 200 via signal line 240.

In some embodiments, the device activator 212 controls a user device 115 to perform certain actions when receiving a signal indicating that a user is in proximity to the user device 115. In some embodiments, a device activator 212 residing in a first user device 115 activates an application on the first user device 115 or pre-loads certain content on the first user device 115 when a second user device 115 of a user is in proximity to the first user device 115. For example, a user is heading home and the user travels with a second user device 115; a first user device 115 detects that the second user device 115 is within proximity and the device activator 212 in the first user device 115 turns on certain applications on the first user device 115 or pre-loads certain content (e.g., music, videos, etc.) on the first user device 115 so that when the user arrives home the user can use the applications or play the content without waiting. In another example, a first user device 115 that resides in a vehicle (e.g., a car) of a user detects that a second user device 115 is within proximity of the vehicle and the device activator 212 in the first user device 115 wakes up the first user device 115 or pre-loads certain content (e.g., a map, music, etc.) for the user to play without delay.

In some embodiments, a device activator 212 of a first user device 115 residing in a store per-loads a user's information on the first user device 115 when the user is within proximity to the store. For example, a user's information can include the user's profile, the user's history of visits to the store, the user's historical shopping records in the store, the user's actions in the store, the user's membership information, etc. For example, when a user is within proximity to a store, the device activator 212 of a first user device 115 residing in the store pre-loads the user's historical shopping records. The device activator 212 can cooperate with the user interface engine 210 to display the user's historical shopping records on the first user device 115 so that the store can prepare for the arrival of the user. For example, if a user orders "skinny latte" in most of the visits to a coffee shop, when the user is approaching the coffee shop again, the coffee shop can be prepared for the same order of the user. This example will be further described in reference to FIG. 8.

In some embodiments, a device activator 212 can load information about the destination on the user device 115 (e.g., a phone) of the user when the user is within proximity to the destination. For example, when a user is approaching a shopping mall, the user device 115 (e.g., a phone) detects that a shopping mall is within proximity to the user (e.g., by pinging for user devices 115 associated with the shopping mall) and therefore a device activator 212 residing on the user device 115 (e.g., a phone) loads mall information (e.g., maps of the stores, coupons, etc.) on the user device 115. Alternatively, a user device 115 residing in the shopping mall can detect the approaching of the user by pinging the user device 115 (e.g., a cell phone) and the user device 115 in the mall sends mall information to the user device 115 (e.g., via the context server 107). The device activator 212 then loads the mall information on the user device 115.

In one example, the device activator 212 is used in a medical setting such as a hospital to load information on the first user device 115 about patients. For example, where the second device 115 belongs to a patient that approaches a check-in center, the administrator's user device 115 loads information associated with the patient as the patient approaches. This could make the medical process faster because the user does not have to wait to check in. In addition, the device activator 212 can load information about what is needed from the patient (e.g. an insurance card, a questionnaire for a new doctor) before the patient arrives, which reduces the need to call the patient back to the check-in desk to provide more information.

The pattern engine 214 can be software including routines for analyzing user actions to identify patterns. In some embodiments, the pattern engine 214 can be a set of instructions executable by the processor 235 to provide the functionality described below for analyzing user actions to identify patterns. In some embodiments, the pattern engine 214 can be stored in the memory 237 of the computing device 200 and can be accessible and executable by the processor 235. The pattern engine 214 may be adapted for cooperation and communication with the processor 235 and other components of the computing device 200 via signal line 242.

In some embodiments, the pattern engine 214 determines one or more patterns based on user's actions. For example, a user device 115 residing in a car of a user detects that the user drives the car from home to work at around 8 AM and from work to home at around 6 PM during weekdays. The pattern engine 214 stored in the user device 115 can then determine a pattern of the user, e.g., driving from home to work at 8 AM and returning at 6 PM on weekdays. In some embodiments, the pattern engine 214 can apply a machine learning technique to learn the patterns of the user's actions. In some embodiments, the pattern engine 214 cooperates with the device activator 212 to determine the patterns of users and to control user device 115 actions based on the patterns of the users. For example, the pattern engine 214 determines that a user leaves work and arrives home at 6:30 PM every weekday and therefore the device activator 212 pre-loads the user's favorite music on a user device 115 (e.g., a music player, etc.) at home around 6:30 PM so that the user can listen to the music right after the arrival.

In some embodiments, the pattern engine 212 cooperates with the device detector 202 to provide suggested actions to user devices 115. For example, the pattern engine 212 stored on a first user device 115 determines that every morning a user associated with a second user device 115 visits the shop where the first user device 115 resides and purchases a certain drink and a certain type of breakfast. When the device detector 202 detects that the second user device 115 is within proximity to the shop in the morning, the pattern engine 214 determines that the user is likely to order the same drink and the same type of breakfast based on the user's pattern. Therefore, the pattern engine 214 can instruct an employee in the shop to prepare the drink and breakfast for the user once the second user device 115 is within proximity to the shop. For example, the pattern engine 214 controls the user interface engine 210 to generate graphical data for providing a user interface that displays a notice of the user's coming and information about the drink and breakfast the user usually orders.

Figure 3:
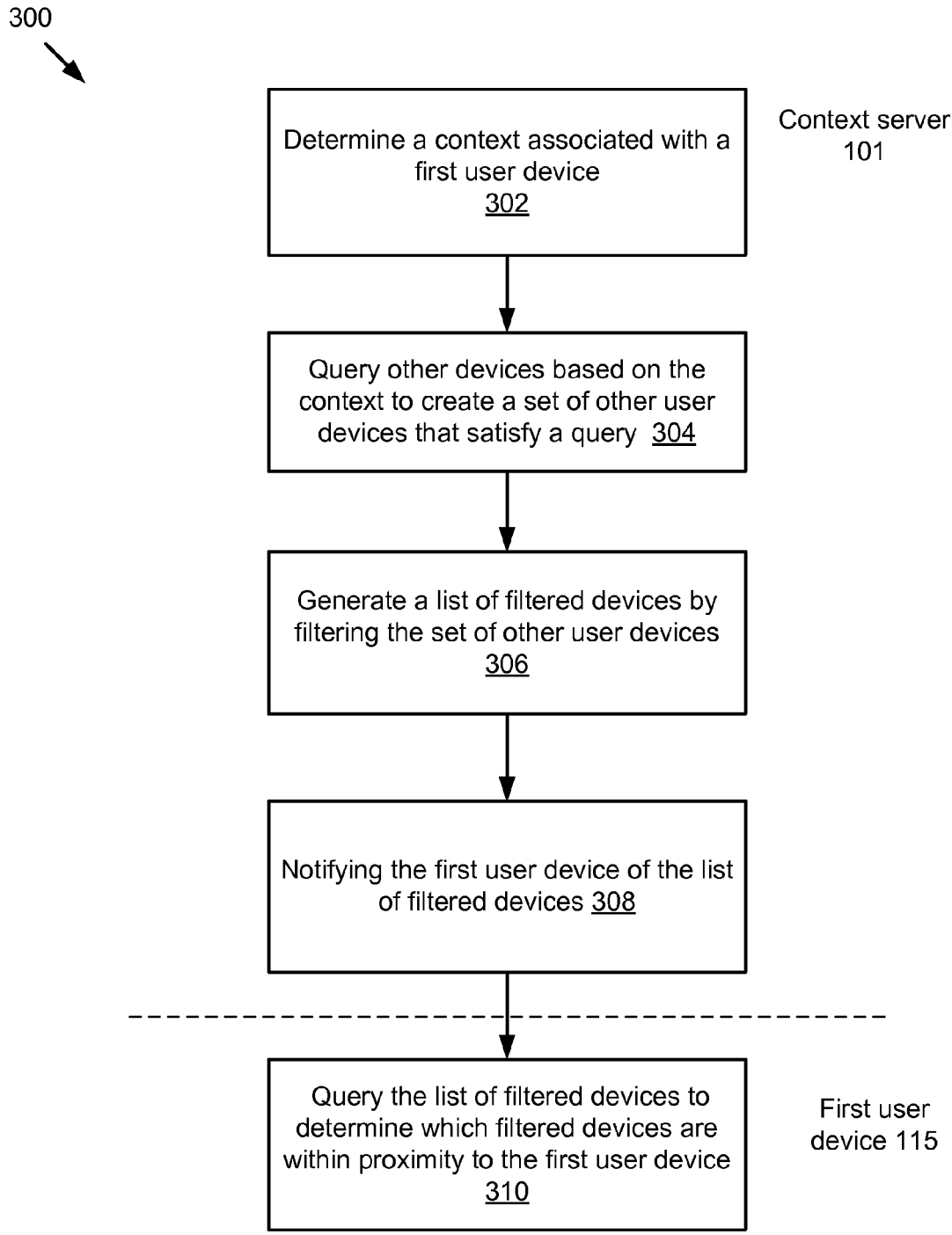
FIG. 3 is a flow chart of an example method for determining proximity between user devices.

FIG. 3 is a flowchart of an example method 300 for determining proximity between user devices 115. In the illustrated embodiment, the method 300 is divided between actions performed by the context server 107 and an action performed by the user device 115. Other configurations are possible. For example, the user device 115 could perform all the steps. The method 300 can include determining 302 a context associated with a first user device 115. For example, the device detector 202 determines context associated with a first user device 115 including a location, a time and/or an action of the first user device 115. The method 300 can include querying 304 other user devices 115 based on the context to create a set of other user devices 115 that satisfy a query. For example, the device detector 202 queries all other user devices 115 within a certain distance (e.g., in a three miles radius) that are associated with second users that the first user may know (e.g., users connected with the first user on a social network, users in the contact list of the first user, co-workers, etc.). In some embodiments, the device detector 202 queries all other user devices 115 within proximity to the first user device 115.

The method 300 includes generating 306 a list of filtered devices by filtering the set of other user devices 115. For example, one or more of the filter engines 204 filters the user devices 115 based on the connections between the first user and the second users associated with the other user devices 115. In some other embodiments, the filter engines 204 filters the second user devices 115 based on their connections with the first user and then the device detector 202 queries the user devices 115 associated with the filtered second users to see if they are within proximity of the first user. The method 300 notifies 308 the first user device of the list of filtered devices. For example, the filter engine 204 transmits the list of filtered devices to the device detector 202 stored on the first user device 115. The first user device 115 queries 310 the list of filtered devices to determine which filtered devices are within proximity to the first user device 115. In some embodiments, the first user device 115 queries using a Bluetooth protocol.

Figure 4:
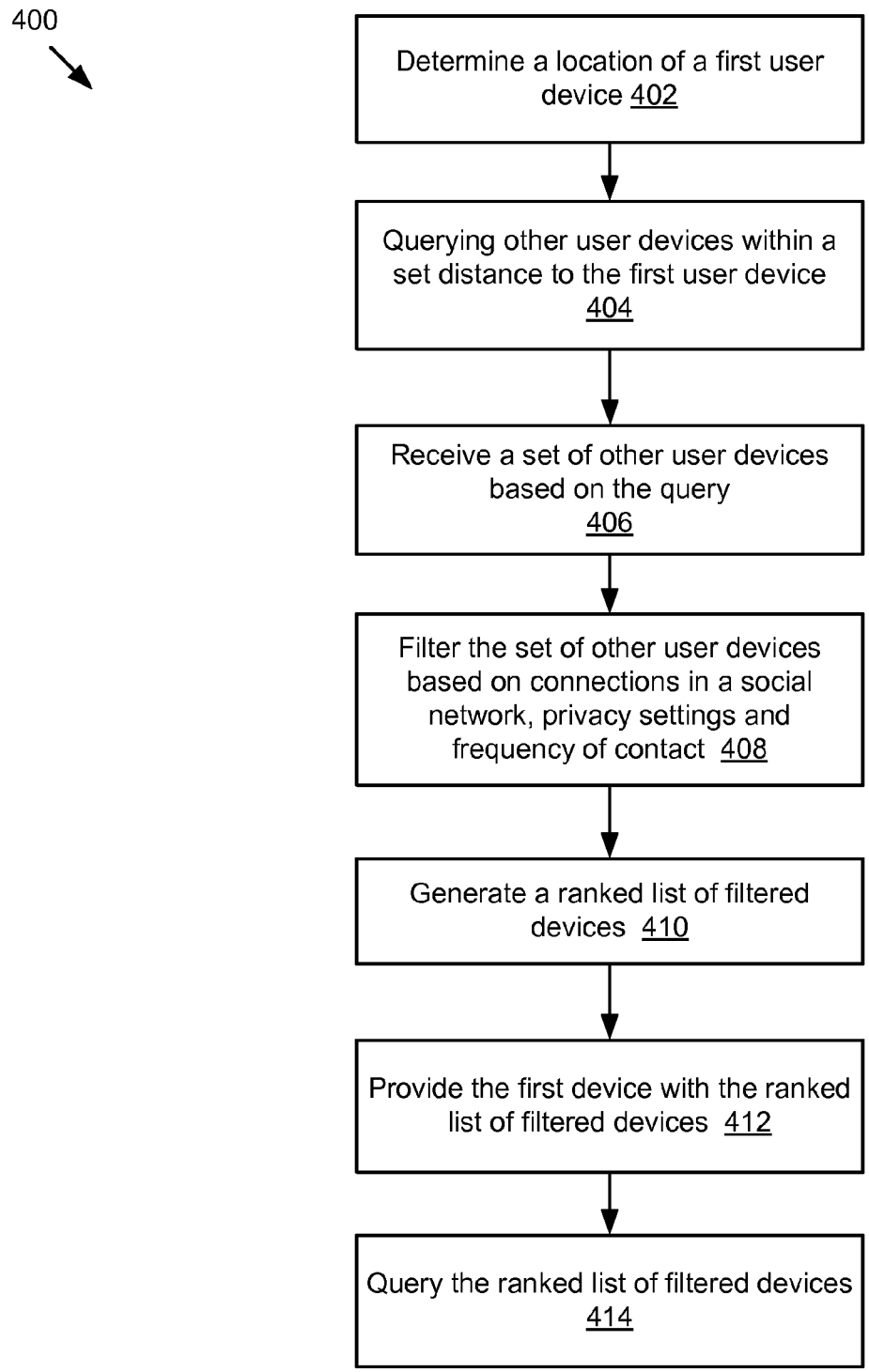
FIG. 4 is flow chart of an example method for notifying a first user device of a list of filtered devices within proximity to the first user device.

FIG. 4 is flow chart of an example method for notifying a first user device of a list of filtered devices within proximity to the first user device. In the illustrated embodiment, the method 400 can include determining 402 a location of a first user device 115 and generating 404 a query for other user devices 115 within a set distance to the first user device 115. The method 400 can include receiving 406 a set of other user devices 115 based on the query.

The method 400 can include filtering 408 the set of other user devices 115 based on connections in a social network, privacy settings and frequency of contact. For example, one or more filter engines 204 filters the set of other user devices 115 received by query based on connections between a set of second users associated with the other user devices 115 and the first user, the privacy settings of the second user devices 115 and the frequency of contact between the set of second users and the first user. In another example, one or more filter engines 204 filter the set of other user devices 115 received from the server based on connections between a set of second users associated with the other user devices 115 and the first user, the privacy settings of the second user devices 115 and the frequency of contacts between the set of second users and the first user. The method 400 can also include generating 410 a ranked list of filtered user devices 115 in a ranked order. For example, the ranking engine 208 rearranges the set of other user devices 115 based on their distances to the first user device 115 and/or closeness of the connections between the second users associated with the filtered user devices 115 and the first user. The ranked list of filtered devices can also be limited by a threshold number of filtered devices that are provided to the first user device 115. For example, the ranked list can be only 10 devices to preserve the first user device's battery life. The method 400 can include providing 412 the first user device 115 with the ranked list of filtered devices. For example, the user interface engine 210 generates graphical data for providing a user interface that displays the ranked list of the filtered devices on the first user device 115. The first user device queries 414 the ranked list of filtered devices, for example, using a Bluetooth protocol, infrared or audio.

Figure 5:
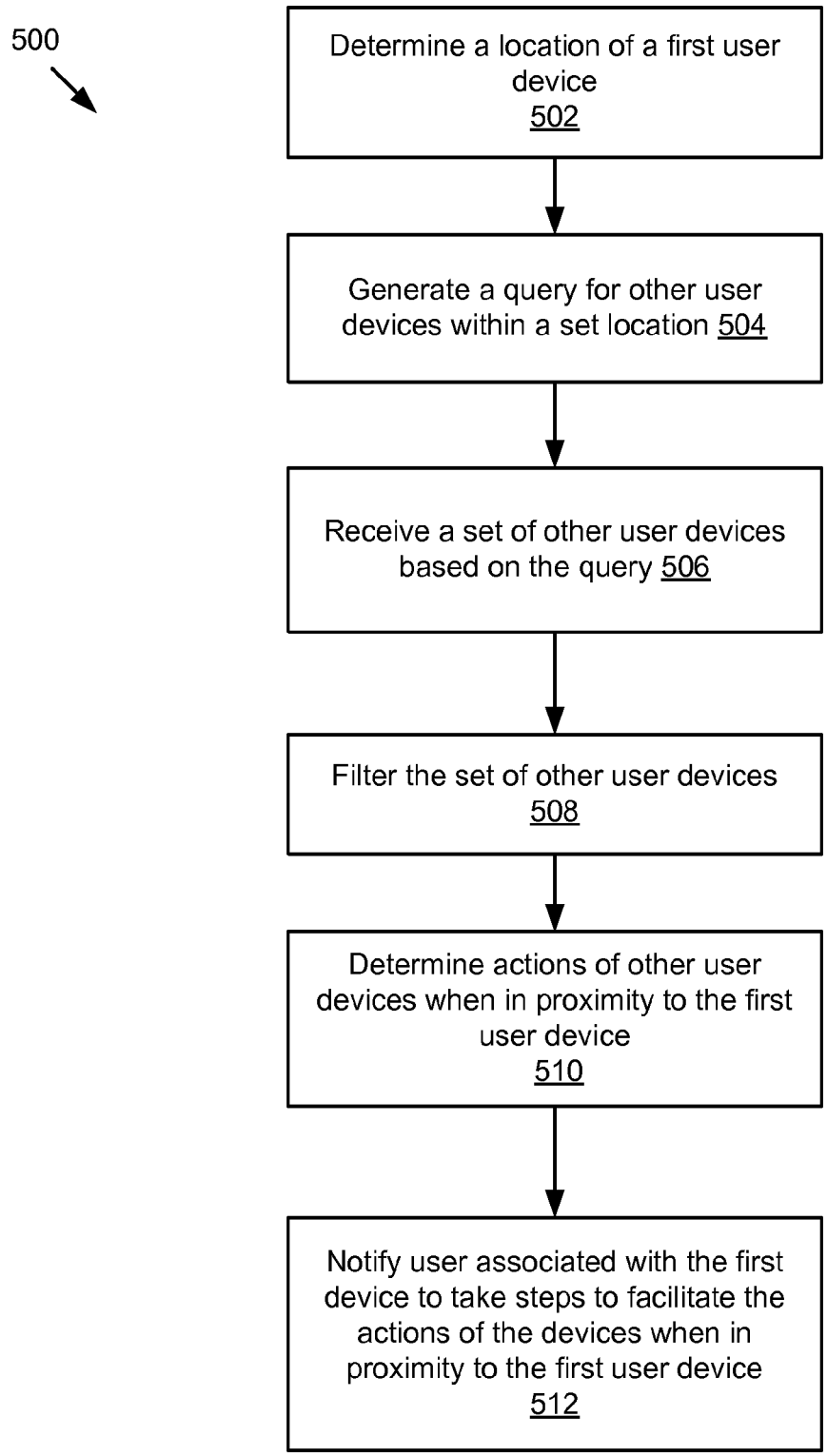
FIG. 5 is a flow chart of an example method for notifying a first user device of actions associated with devices within proximity to the first user device according to one embodiment.

FIG. 5 is an example method for notifying a first user device of actions associated with devices within proximity to the first user device according to one embodiment. The method 500 can include determining 502 a location of a first user device 115. For example, the device detector 202 determines that the first user device 115 is in a coffee shop. The method 500 can include generating 504 a query for other user devices 115 within a set location. For example, the device detector 202 queries other user devices 115 used by users who are within proximity to the shop and has purchased coffee in the shop. The method 500 can also include receiving 506 a set of other user devices 115 based on the query. The method 500 can include filtering 508 the set of other user devices 115 and determining 510 actions of the other user devices 115 within the set when in proximity to the first user device 115 before. For example, the device activator 212 determines historical actions of the users associated with the other user devices 115 (e.g., ordering a certain drink) when they have been in proximity to the first user device 115. In another example, the pattern engine 216 determines a pattern of the users' actions when they have been in proximity to the first user device 115. The method 500 can include notifying 512 a user associated with the first user device 115 to take steps to facilitate the actions of the user devices 115 when in proximity to the first user device 115. For example, the device activator 212 notifies the user of the first user device 115 to prepare a certain drink for a second user based on the determination that the second user usually orders the certain drink when the second user device 115 was detected to be within the proximity to the first user device 115, which indicates the second user was in the shop.

FIG. 6 is a graphic representation 600 of an example user interface generated by the user interface engine 210 for providing a user with proximity of other users. In the illustrated embodiment, the user interface 600 includes a proximity button 601 clickable for a user to choose to find who is nearby. For example, if the first user clicks the proximity button 601, a list 603 of other users who are near the first user will appear. The list 603 includes entries 611, 613, 615 that indicate three other users near the first user, how they are connected to the first user and their current physical distances to the first user. In the illustrated embodiment, the list 603 can be a ranked list generated by the ranking engine 208 based on certain criteria. For example, the list 603 of other users 611, 613, 615 can be ranked based on how closely they are connected to the first user and how far they are physically from the first user. The second user 613 is physically farther away from the first user than the third user 615, however, is ranked higher because the second user 613 has a much closer connection to the first user (e.g., family) than the third user 615 (e.g., follower) has.

FIG. 7 is a graphic representation 700 of an example user interface generated by the user interface engine 210 in which a user can permit others to detect the user's proximity according to one embodiment. The example user interface 700 includes a permission button 701 clickable for a user to make privacy settings. For example, if the user clicks the permission button 701, the user interface 700 provides detection permission options for the user to select. In the illustrated example, the user interface 700 displays a permission option box 703 including optional entries that can be selected by the user to permit everyone, only people the user follows or the user is friends with in certain social networks, only people the user has contacted at least once, or certain other users specified by the user.

FIG. 8 is a graphic representation 800 of an example user interface generated by the user interface engine 210 for providing actions of a user when in proximity according to one embodiment. The example user interface 800 includes a proximity button 801 clickable for a user to find who is nearby. For example, the user interface 800 is displayed on a user device 115 in a coffee shop and an employee of the shop can click the proximity button 801 to find any users near the coffee shop. If the user device 115 detects any users within proximity, the user interface 800 provides a notice 803 indicating that a user is nearby. For example, the notice 803 indicates that a user (e.g., Sara D.) is only 0.5 miles away and she may want to order coffee. The user device 115 can then retrieves an order history of the user and the user interface 800 can display the user's order history 805 upon which the employee of the shop can determine an action. For example, the user's order history 805 indicates that the user (e.g., Sara) usually orders a certain coffee (e.g., skinny latte). The employee of the coffee shop can then prepare the certain coffee for the user based on the user's order history.

In the above description, for purposes of explanation, numerous specific details are set forth in order to provide a thorough understanding of the specification. It will be apparent, however, to one skilled in the art that the disclosure can be practiced without these specific details. In other embodiments, structures and user devices 115 are shown in block diagram form in order to avoid obscuring the description. For example, the present embodiment is described in one embodiment below primarily with reference to user interfaces and particular hardware. However, the present embodiment applies to any type of computing device that can receive data and commands, and any peripheral devices providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions that follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms including "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present embodiment of the specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, including, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In a preferred embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments of the specification has been presented for the purposes of illustration and description. It is not intended to be exhaustive or to limit the specification to the precise form disclosed. Many modifications and variations are possible in light of the above teaching. It is intended that the scope of the disclosure be limited not by this detailed description, but rather by the claims of this application. As will be understood by those familiar with the art, the specification may be embodied in other specific forms without departing from the spirit or essential characteristics thereof. Likewise, the particular naming and division of the modules, routines, features, attributes, methodologies and other aspects are not mandatory or significant, and the mechanisms that implement the specification or its features may have different names, divisions and/or formats. Furthermore, as will be apparent to one of ordinary skill in the relevant art, the modules, routines, features, attributes, methodologies and other aspects of the disclosure can be implemented as software, hardware, firmware or any combination of the three. Also, wherever a component, an example of which is a module, of the specification is implemented as software, the component can be implemented as a standalone program, as part of a larger program, as a plurality of separate programs, as a statically or dynamically linked library, as a kernel loadable module, as a device driver, and/or in every and any other way known now or in the future to those of ordinary skill in the art of computer programming. Additionally, the disclosure is in no way limited to embodiment in any specific programming language, or for any specific operating system or environment. Accordingly, the disclosure is intended to be illustrative, but not limiting, of the scope of the specification, which is set forth in the following claims.

What is claimed is:

1. A computer-implemented method comprising:
   determining, using one or more processors of a server, a context associated with a first user device, the context including a future action associated with the first user device that will occur after a certain time period;
   pre-calculating, using the one or more processors of the server, a set of one or more other user devices by performing a first query for a plurality of other user devices within a first range using a first communication channel based on the context including the future action associated with the first user device, the first communication channel is accessible from a device that also includes a global positioning system;
   filtering the set of one or more other user devices pre-calculated from the first query within the first range using the first communication channel based on connections between a first user associated with the first user device and second users associated with the set of one or more other user devices;
   generating, using the one or more processors of the server, from the set of one or more other user devices pre-calculated from the first query within the first range using the first communication channel, a list of one or more filtered devices for the first user device that includes a threshold number of filtered devices; and
   transmitting the list of one or more filtered devices from the server to the first user device for display on the first user device to cause the first user device to perform a second query of one or more devices on the list of one or more filtered devices, the second query performed using a second communication channel to determine which filtered devices are within proximity to the first user device, the second communication channel including at least one of a Bluetooth protocol, infrared, and audio.

2. The method of claim 1, further comprising:
   receiving tokens instead of media access control addresses for the filtered devices on the list of one or more filtered devices; and
   querying for the tokens.

3. The method of claim 1, wherein filtering the set of one or more other user devices is based on a threshold degree of separation between the first user associated with the first user device and the second users associated with the set of one or more other user devices.

4. The method of claim 1, wherein filtering the set of one or more other user devices is based on a threshold number of interactions between the first user associated with the first user device and the second users associated with the set of one or more other user devices.

5. The method of claim 1, wherein the context includes one or more of a location, a time, and an ongoing action associated with the first user device.

6. The method of claim 1, wherein filtering the set of one or more other user devices is based on privacy settings of the one or more other user devices.

7. The method of claim 1, further comprising:
   ranking the one or more filtered devices that are within proximity to the first user device based on their proximity to the first user device and one or more connections between the first user device and the one or more filtered devices; and
   notifying the first user of the one or more filtered devices in a ranked order.

8. The method of claim 1, further comprising:
determining actions of the other user devices when in proximity to the first user device; and
notifying the first user associated with the first user device to take steps to facilitate the actions of the other user devices when in proximity to the first user device.

9. The method of claim 1, wherein the first user device is located at a destination and further comprising responsive to the one or more filtered devices being within proximity to the first user device, sending information about the destination to the one or more filtered devices.

10. The method of claim 9, wherein the information is a coupon for the destination or a map of the destination.

11. The method of claim 1, wherein the first user device is located at a destination and further comprising responsive to the one or more filtered devices being within proximity to the first user device, activating the other user devices or applications.

12. A computer program product comprising a non-transitory computer usable medium including a computer readable program, wherein the computer readable program when executed on a computer causes the computer to:
determine a context associated with a first user device, the context including a future action associated with the first user device that will occur after a certain time period;
pre-calculate a set of one or more other user devices by performing a first query for a plurality of other user devices within a first range using a first communication channel based on the context including the future action associated with the first user device, the first communication channel is accessible from a device that also includes a global positioning system;
filter the set of one or more other user devices pre-calculated from the first query within the first range using the first communication channel based on connections between a first user associated with the first user device and second users associated with the set of one or more other user devices;
generate, from the set of one or more other user devices pre-calculated from the first query within the first range using the first communication channel, a list of one or more filtered devices for the first user device that includes a threshold number of filtered devices; and
transmit the list of one or more filtered devices from the computer to the first user device for display on the first user device to cause the first user device to perform a second query of one or more devices on the list of one or more filtered devices, the second query performed using a second communication channel to determine which filtered devices are within proximity to the first user device, the second communication channel including at least one of a Bluetooth protocol, infrared, and audio.

13. The computer program product of claim 12, wherein filtering the set of one or more other user devices is based on a threshold degree of separation between the first user associated with the first user device and the second users associated with the set of one or more other user devices.

14. The computer program product of claim 12, wherein filtering the set of one or more other user devices is based on a threshold number of interactions between the first user associated with the first user device and the second users associated with the set of one or more other user devices.

15. The computer program product of claim 12, wherein filtering the set of one or more user devices is based on privacy settings of the one or more other user devices.

16. The computer program product of claim 12, wherein the computer readable program is further configured to cause the computer to:
rank the one or more filtered devices that are within proximity to the first user device based on their proximity to the first user device and one or more connections between the first user device and the one or more filtered devices; and
notify the first user of the one or more filtered devices in a ranked order.

17. The computer program product of claim 12, wherein the computer readable program is further configured to cause the computer to:
determine actions of the other user devices when in proximity to the first user device; and
notify the first user associated with the first user device to take steps to facilitate the actions of the other user devices when in proximity to the first user device.

18. The computer program product of claim 12, wherein the first user device is located at a destination and further comprising responsive to the one or more filtered devices being within proximity to the first user device, activating the other user devices or applications.

* * * * *